(12) United States Patent
Malyshev et al.

(10) Patent No.: US 8,539,480 B2
(45) Date of Patent: Sep. 17, 2013

(54) MULTI-INSTANCE "SHADOW" SYSTEM AND METHOD FOR AUTOMATED RESOURCE REDUNDANCY REDUCTION ACROSS DYNAMIC LANGUAGE APPLICATIONS UTILIZING APPLICATION OF DYNAMICALLY GENERATED TEMPLATES

(75) Inventors: Stanislav Malyshev, San Jose, CA (US); Lila Tretikov, Los Gatos, CA (US); Clint Oram, San Mateo, CA (US)

(73) Assignee: SugarCRM Inc., Cupertino, CA (US)

( * ) Notice: Subject to any disclaimer, the term of this patent is extended or adjusted under 35 U.S.C. 154(b) by 0 days.

(21) Appl. No.: 13/171,731

(22) Filed: Jun. 29, 2011

(65) Prior Publication Data

US 2011/0314447 A1 Dec. 22, 2011

Related U.S. Application Data

(63) Continuation-in-part of application No. 12/100,322, filed on Apr. 9, 2008.

(60) Provisional application No. 60/922,606, filed on Apr. 9, 2007, provisional application No. 60/977,521, filed on Oct. 4, 2007.

(51) Int. Cl.
*G06F 9/44* (2006.01)

(52) U.S. Cl.
USPC .............................................. 717/177; 717/110

(58) Field of Classification Search
USPC ................................................. 717/110, 177
See application file for complete search history.

(56) References Cited

U.S. PATENT DOCUMENTS

| 6,199,116 | B1 * | 3/2001 | May et al. | 719/310 |
|---|---|---|---|---|
| 7,082,600 | B1 * | 7/2006 | Rau et al. | 717/148 |
| 2006/0031757 | A9 * | 2/2006 | Vincent | 715/513 |
| 2006/0092861 | A1 * | 5/2006 | Corday et al. | 370/256 |
| 2006/0245354 | A1 * | 11/2006 | Gao et al. | 370/230 |
| 2013/0047150 | A1 * | 2/2013 | Malasky et al. | 717/176 |

* cited by examiner

*Primary Examiner* — Chat Do
*Assistant Examiner* — Lynda Dinh
(74) *Attorney, Agent, or Firm* — Steven M. Greenberg, Esq.; Carey, Rodriguez, Greenberg & O'Keefe

(57) ABSTRACT

A system and method are provided that allows, by adding a loadable module to the language runtime engine and overriding some of the core engine's operating system access functionality, the system to create a customizable copy of the installed application without creating complete copies of the actual files (scripts, executables, binaries, etc.) and without redundancies in content storage.

13 Claims, 7 Drawing Sheets

MULTI-INSTANCE "SHADOW" SYSTEM AND METHOD FOR AUTOMATED RESOURCE REDUNDANCY REDUCTION ACROSS DYNAMIC LANGUAGE APPLICATIONS UTILIZING APPLICATION OF DYNAMICALLY GENERATED TEMPLATES

PRIORITY CLAIMS/RELATED APPLICATIONS

This patent application is a continuation in part and claims priority under 35 USC 120 to U.S. patent application Ser. No. 12/100,322, filed on Apr. 9, 2008 and entitled "Data Center Edition" which in turn claims priority under 35 USC 119(e) to U.S. Provisional Patent Application Serial Nos. 60/922,606 filed on Apr. 9, 2007 and 60/977,521, filed on Oct. 4, 2007, all of which are incorporated herein by reference.

FIELD

The system and method relate generally to a generalized system and method for enabling execution of numerous altered versions of a computer software application on the common computer hardware/software infrastructure, allowing significant reduction in the required execution, memory and disc resources when these applications share significant amount of the code. The solution can be generally applied to any type of computer infrastructure configuration, including, but not limited to independent systems, grid and cluster-enabled systems, infrastructure-as-a-service systems, and generalized cloud architectures. The solution is applicable to both centralized and non-centralized file management systems.

BACKGROUND

Software applications rely on the file systems management component of the operating system to provide access to the executable code of the application. Typically the generalized operating system's controls are used to manage the actual functions performed on the files comprising this codebase. While these generalized controls are sufficient for most uses required by the file management clients, there is a significant gap in managing executable files for the highly scalable, multi-instance software systems used in the modern web-enabled technologies, especially those utilizing dynamic languages.

Highly scalable multi-instance dynamic language applications create specific demands on the file system and the operating system as a whole. The scalability requirement often dictated that the applications span hundreds to thousands of physical or virtual hosts, each with its own copy of the operating system, to achieve the capacity demands. Multi-instance form of deployment requires that a number of copies of the code, possible with a range of alterations, be executed in parallel across the previously described cluster of nodes. Finally, the dynamic nature of the language and the application presents a challenge that the code is read, executed (and even potentially modified and written back to the file system by the application) on every invocation. Due to these requirements the default function of the file system presents clear challenges in sharing, redundancy, speed of execution and the amount of storage required for efficiently servicing this type of application.

One of the popular models of delivering modern computer software is a Cloud-base, infrastructure. Cloud infrastructure is generally mapped to three layers: infrastructure components (servers, virtual machines, operating systems, etc.), platform components (data access queues, databases, file stores, etc.) and software (applications). Cloud software delivery component (also knows as SaaS or Software as a Service) presents an application that runs utilizing the network, hardware and systems software of the provider of the service and the user accesses it via the network (most typically over http(s) protocol). This frequently employs many users of the same software, implementing the same service, using the same provider.

In order to achieve the desired scale the software can be then deployed in either a multi-tenant configuration (all users share the same application) or multi-instance configuration (customers are mapped logically to a specific version of the application based on an arbitrary condition such as company affiliation and many instances of a given application are deployed). The multi-instance deployment allows the provider to enable customers with higher level of control, flexibility and customizability with respect to their application. In order to ensure the latter some clients will require extensive customization of their service software, to the point where the same installation of the application is unable to serve the needs of all customers, and different modifications of the application, including code modified according to the user preferences, is necessary.

Similar needs arise when logical isolation of systems is required in order to comply with a variety of security modes in a virtualized environments or when the software has self-generation capabilities, which modifies codebase dynamically throughout the execution process.

Traditional way of addressing these issues involved deploying multiple versions of software—each with its own codebase, execution stack and frequently execution process. This method satisfied the basic requirements for code customization and logical code segregation, however it created resource overhead in hardware, processing, labor and costs. Thus in order to save costs, it is a frequent scenario that the provider is running the software for multiple clients on a shared set of hardware, thus reducing the hardware costs. However, when the copies of the software are differentiated as described above, each of them has to be treated as separate piece of software, and has to be allocated disk space, memory space, etc. for its function. This creates high marginal costs for adding a new user to the system and leads to suboptimal utilization of the hardware resources.

Thus, it is desirable to allow the provider to run multiple instances of the computer software that share significant portions of the software metadata and code via the multi-instance share-what-is-possible system. By using this system, SaaS providers can significantly reduce their marginal cost of creating a copy of the software for each additional user, while still allowing to customize it independently from other copies according to user requirements.

DETAILED DESCRIPTION OF ONE OR MORE EMBODIMENTS

The system and method are particularly applicable to an customer relationship management software system and it is in this context that the system and method will be described. It will be appreciated, however, that the algorithms, data structures, processes and modules of the system and method have greater utility since these modules, algorithms, data structures and processes disclosed herein can be equally applied to other CRM systems, as well as other business software application systems as well as other database software systems. For purposes of illustration, the described system is an implementation in a customer relationship management (CRM) and groupware system. In the example below, the CRM and groupware system described below is the Sugar Enterprise version 6 that is soon to be commercially available from SugarCRM Inc. In addition to the example below, the system and method may be more generally applied to any type of computer infrastructure configuration, including, but not limited to independent systems, grid and cluster-enabled systems, infrastructure-as-a-service systems, and generalized cloud architectures and the solution is applicable to both centralized and non-centralized file management systems.

The system may be implemented using a base class known as SugarBean, and a data retrieval API. A few of the methods provided in the base class include methods for building list queries, saving, and retrieving individual items. Each specific type of data creates a subclass of this base class. The base class is called SugarBean in the illustrative example that is described below. There is at least one subclass of SugarBean for each module. SugarBeans also are used for creating database tables, cleaning out database tables, loading records, loading lists, saving records, and maintaining relationships. One example of a SugarBean subclass is a Contact subclass. The Contact subclass is a simple object that fills in some member variables on the SugarBean and leverages SugarBean for much of its logic and functionality. For example, the security associated with the Contact subclass is automatically created for Contact by SugarBean that contains, among other things, the functions and processes that are shared by the other modules. Another example of a SugarBean subclass is Users which is a module that is security related and contains the list of users as well as users who should not have row level security (described below in more detail) applied to them. For this reason these modules have the bypass flag set to skip adding the right join for verifying security. The SugarCRM Sugar Professional system is a web based system with many concurrent users. Since this program contains critical data to the users, it is imperative that they have quick access to the system and their data. The most frequent activity in the program is to look at existing data.

Figure 1A:
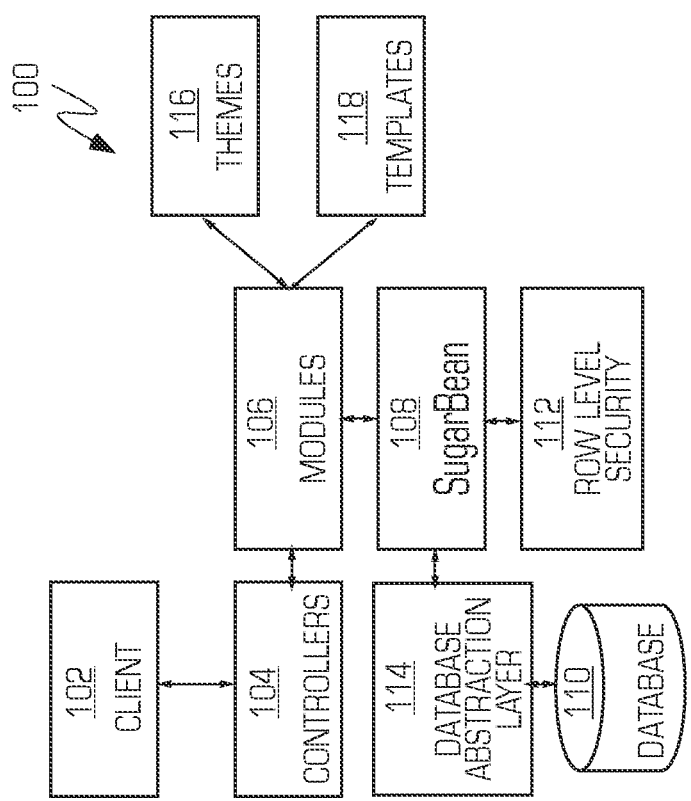
FIG. 1A is a diagram illustrating an implementation of a business software application system, implementing a customer relationship management system, that incorporates various features.
Figure 1B:
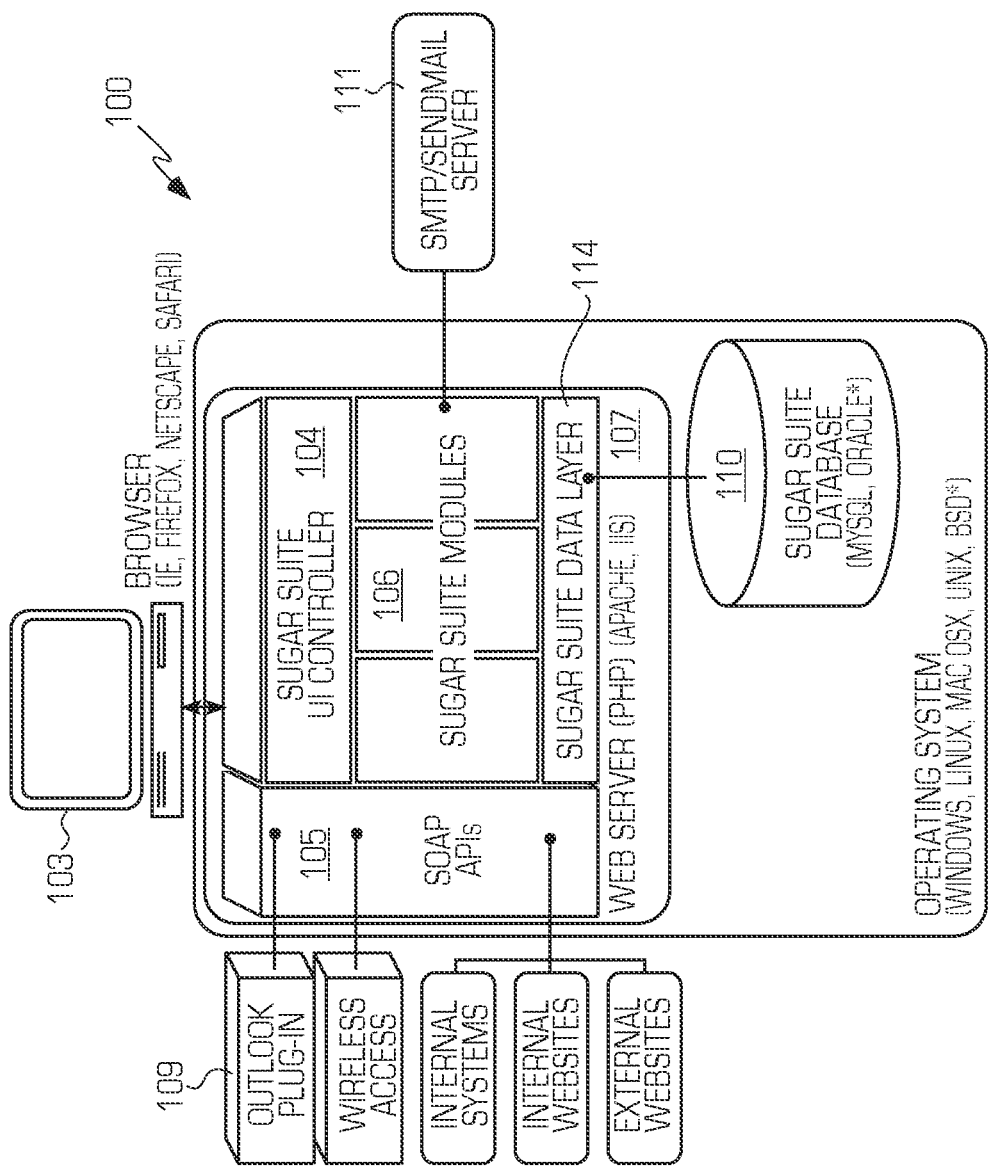
FIG. 1B illustrates more details of the business software application system that incorporates various features.

FIG. 1A is a diagram illustrating a customer relationship management (CRM) system 100 that is an example of a software-based business software application. In one embodiment, the system 100 may be implemented as a software system and the elements shown in FIGS. 1A and 1B are thus implemented as a plurality of lines of computer code that may be executed by a processor of a computer system, such as a server computer wherein the various lines of computer code are stored in a memory associated with the computer system and the system interfaces with a database 110 that stores the data associated with the system 100. The system may have one or more clients 102, such as a browser application executed on a typical computing device (a browser client session), that accesses the system over a communications network 103 such as the Internet, a cellular network, a wireless network and the like. The computing devices may include a laptop, table or desktop computer system, a PDA, a mobile phone, a portable wireless email device and the like. The client's 102 interactions with the system are managed and go through a set of one or more controllers 104. The controllers 104 are the entry-point into the system for an entity that is using the system wherein the entity may be a person who accesses the system, such as by using a browser application, a computing device or a software program that uses this entry point. The controllers 104 take care of functions and operations including, for example, session tracking, session security and user authentication. The controllers also, for each user, prepare the screen/user interface or the wrapper for the content and determine which module of the application the user is trying to access and get the requested module to process the request.

The system has one or more modules 106 that are components of application functionality and provide certain functionality to the entity accessing the system. The modules 106 of the exemplary CRM system shown in FIG. 1A may include, by way of example, a portal module, a calendar module, an activities module, a contacts module, an accounts module, a leads module, an opportunities module, a quotes module, a products module, a cases module, a bug tracker module, a documents module, an emails module, a campaigns module, a project module, an RSS module, a forecasts module, a reports module and a dashboard module. The system may include different, more or fewer modules and the systems with those other combination of modules are within the scope of the system and method. Each of these modules provides a different functionality to the users of the system so that, for example, the calendar module provides a calendaring functionality to the CRM system that is instantiated with the system. The system may also include an administration module that handles the typical administrative functions of the system. In the exemplary system shown in FIG. 1A, each module contains a subclass of a SugarBean base object 108 and each module references the SugarBean to retrieve the data from the database 110 required for display and uses certain functions and operations instantiated in the SugarBean base object.

Figure 2:
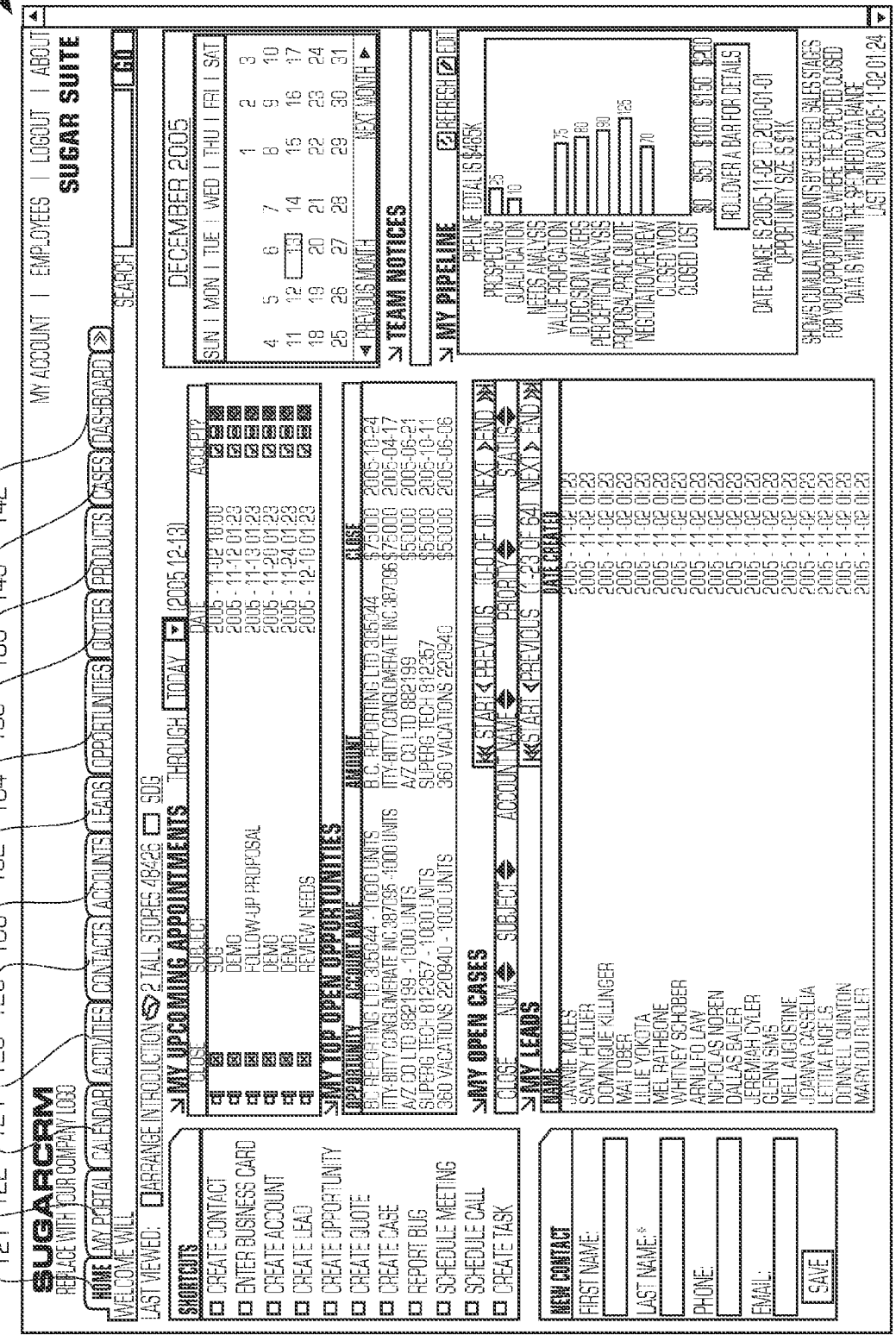
FIG. 2 is a diagram illustrating an example of the user interface of the system in FIGS. 1A and 1B.

FIG. 2 is a diagram illustrating an example of the user interface 120 of the system in FIGS. 1A and 1B. The user interface may include a home tab 121 (that is selected in FIG. 2) that provides a general overview of Cases, Opportunities, Appointments, Leads, Tasks, Calendar, Team Notices, and Pipeline for the particular user since each user interface is customized for each user based on the access levels and parameters associated with that particular user. The home tab may also include shortcuts to enter various different types of data, and a quick form for new contacts. The home tab also provides a quick overview of what customer tasks and activities that the user needs to focus on today. The portal module (selected using a "My portal" tab 122), contains a series of shortcuts which can link to any web site chosen by the user that may include e-mail, forums, or any other web-based application, allowing the system to become a single user interface for multiple applications. The calendar module may be selected by a calendar tab 124 and allows the user to view scheduled activities (by day, week, month or year), such as meetings, tasks, and calls. The system also allows the user to share his/her calendar with coworkers which is a powerful tool for coordinating the daily activities. The activities module is selected using an activities tab 126 and allows the user to create or update scheduled activities, or to search for existing activities. By managing Activities within the context of an Account, Contact, Lead, Opportunity, or Case, the system allows the user to manage the myriad of calls, meetings, notes, emails and tasks that the user needs to track in order to get the job done. The tasks are for tracking any action that needs to be managed to completion by a due date, the notes allow the user to capture note information as well as upload file attachments, the calls allow the user to track phone calls with leads and customers, meetings are like calls, but also allow the user to track the location of the meeting and emails allow the user to archive sent or received email messages and to send or receive email messages.

The contacts module is accessed by a contacts tab 128 and allows the user to view a paginated contact list, or search for a contact. The user can click on a specific contact to zoom in on the detailed contact record and, from a specific contact record, the user may link to the related account, or leads, opportunities, cases, or direct reports (related contacts). Within the system, contacts are the people with whom the organization does business. As with accounts, the system allows the user to track a variety of contact information such as title, email address, and other data. Contacts are usually linked to an Account, although this is not required. The accounts module may be accessed using an accounts tab 130 and the user may view a paginated account list, or search for an account. The user can click on a specific account to zoom in on the detailed account record and, from a specific account record, the user may link to related contacts, activities, leads, opportunities, cases, or member organizations. Accounts are the companies with which the organization does business and the system allows the user to track a variety of information about an account including website, main address, number of employees and other data. Business subsidiaries can be linked to parent businesses in order to show relationships between accounts.

The leads module may be accessed by a leads tab 132 that permits the user to view a paginated list of leads, or search for a specific lead. The user can click on an individual lead to zoom in on the lead information record and, from that detailed lead record, the user can link to all related activities, and see the activity history for the lead. Leads are the people or companies with whom the organization might do business in the future. Designed to track that first point of interaction with a potential customer, leads are usually the hand off between the marketing department and the sales department. Not to be confused with a contact or account, leads can often contain incomplete or inaccurate information whereas contacts and accounts stored in Sugar Enterprise are core to many business processes that require accurate data. Leads are typically fed into the Sugar Enterprise stem automatically from your website, trade show lists or other methods. However, the user can also directly enter leads into Sugar Enterprise manually.

The opportunities module is accessed by an opportunities tab 134 and permits the user to view a paginated list of opportunities, or search for a specific opportunity. The user can click on an individual opportunity to zoom in on the opportunity information record and, from that detailed opportunity record, the user can link to all related activities, see the activity history for the opportunity, and link to related leads and contacts. Opportunities track the process of selling a good or service to a potential customer. Once a selling process has commenced with a lead, a lead should be converted into a contact and possibly also an account for example among other items. Opportunities help the user manage the selling process by tracking attributes such as sales stages, probability of close, deal amount and other information. The quotes module may be accessed by a quotes tab 136 and permits the user to view a paginated list of customer quotes, or search for a specific quote. The user can click on an individual quote to zoom in on the detailed quote information. A quote is formed by referencing product and pricing from a catalog of products you may create. A presentation quality Portable Document Format (PDF) representation of the quote may be created to fax or email to a client. Quotes may be associated with, for example, Accounts, Contacts, or Opportunities among other modules in the system and the system is not limited to a quote being associated with any particular set of modules.

The products module may be accessed by a products tab 138 and permits the user to view a paginated list of products, or search for a specific product. The user can click on an individual product to zoom in on the detailed product information. A product is used when assembling a customer quote. The cases module may be accessed using a cases tab 140 and may permit the user to view a paginated list of cases, or search for a specific case. The user can click on an individual case to zoom in on the case information record and, from that detailed case record, the user can link to all related activities, see the activity history for the case, and link to related contacts. The cases are the handoff between the sales department and the customer support department and help customer support representatives manage support problems or inquiries to completion by tracking information for each case such as its status and priority, the user assigned, as well as a full trail of all related open and completed activities. A dashboard module may be accessed using a dashboard tab 142 and permits the user to view a dashboard of the information in the CRM system.

The documents module may show the user a list of documents that the user can access, view and/or download. The user can also upload documents, assign publish and expiration dates, and specify which users can access them. The email module allows the user to write and send emails and to create Email Templates that can be used with email-based marketing campaigns. The user can also read, compose, save drafts, send and archive emails. The campaigns module helps the user implement and track marketing campaigns wherein the campaigns may be telemarketing, web banner, web tracker, mail or email based. For each Campaign, the user can create the Prospects list from the Contacts or Leads or outside file sources. The projects module helps the user manage tasks related to specific projects. Tasks can be assigned to different users and assigned estimated hours of effort and, as tasks are in progress and completed, users can update the information for each task. The RSS module permits the user to view the latest headlines provided by your favorite Really Simple Syndication (RSS) feeds. These feeds provide news or other web content that is distributed or syndicated by web sites which publish their content in this manner. The system has information on hundreds of RSS feeds available as supplied, and others may easily be added.

The forecasts module shows the user his/her committed forecast history and current opportunities. For managers, the user can view your team's rolled up forecasts. The reports module shows the user a list of saved custom reports not yet published, as well as a list of Published Reports. Saved reports may be viewed, deleted or published, and published reports may be viewed, deleted or un-published. Clicking on the name of a report zooms to the detailed definition of the report criteria (fields to be displayed, and filter settings) for that report, permitting the user to alter the criteria, and resubmit the report query. Finally, the dashboard module displays a graphical dashboard of the user's Opportunity Pipeline by Sales Stage, Opportunities by Lead Source by Outcome, Pipeline by Month by Outcome, and Opportunities by Lead Source. The system also supports users putting graphs from their reports directly on their dashboards.

Returning to FIG. 1A, the system also includes the database 110 that contains the data of the system and a security module 112 (row level security) that implements the security methods to control access to the data in the database 110 since the database is shared by all users of the system and the data must be segregated based on the users and their access level to different pieces of data. The system may also include a database abstraction layer 114 that is coupled between the database 110 and the SugarBean object 108 and acts as an interface between the database 110 and the SugarBean object 108. The SugarBean object 108 provides the base logic required for retrieving, making available and writing information to/from the database and each module creates subclasses of SugarBean (an example of which was described above) to provide module specific details, module specific data and module specific data views. During the process of retrieving data from the database, the SugarBean 108 makes calls that populate the row level security information into the SQL engine/database management system that retrieves the data.

Once the data is retrieved from the database by the SugarBean object 108, the module uses a template mechanism 118 and a theme 116 to produce the requested presentation (user interface) for the user. The template mechanism reformats the data from the database 110 into a particular form while the theme adjusts the user interface according to the user's preferences.

If, for instance, the user requests an HTML presentation of the detail view of the contact module for a specified contact, the system may perform that request as will now be described. The request of the user is directed to controller named index.php that handles most of the logic for the main application. The controller loads the current user information, verifies authentication and session information for the particular user session, loads the language for the user (based on the user preferences) and generates some of the user interface shell. The controller then calls the contact module and request the detail view for the specified contact. The contact module then retrieves the requested contact using the Sugarbean. The SugarBean verifies row level security for the requested contact at this point (with assistance from the security module 112. If the record is not retrieved successfully, then the process aborts and the user is not allowed to view the data for the record. If the retrieve process succeeds with the requested contact data, the Contact module uses the templating mechanism, such as for example XTemplate or Smarty, in the template mechanism 118 and the code for the current user's theme (retrieved by the theme module 116) is used to create the user interface for the presentation of the particular Contact data to the particular user. The resulting user interface then is sent back to the computing device with of client that requested it.

FIG. 1B illustrates more details of the customer relationship management system 100. Like elements shown in FIGS. 1A and 1B have like reference numerals. The system may interface with a typical browser application 103 (being executed by a computing device) that can access the system 100 over the web. For example, the examples of the user interface below are web-based views generated by the system and displayed on a browser application. The system may further comprise an application programming interface (APIs) portion 105, that may preferably use the well known simple object access protocol (SOAP), to interface with other existing system and applications. For example, the APIs may be used to interface to an email plug-in 109, such as an SugarCRM Plug-In for Microsoft Outlook®, that enhances the email program to allow it to interact with the system 100. As shown, the system 100, in one implementation, is implemented on a web server application 107 (that may be the well known Apache web server that includes IIS functionality) that generates dynamic web pages (using the known PHP language). The web server and the other elements of the system may be implemented as software running on one or more servers wherein the servers may use various different operating system as shown in FIG. 1B. The system 100 may also have an email module 111 capable of sending email via a local program (that may preferably be sendmail) or an email server leveraging the SMTP protocol. Now, a system and method that allow a provider to run multiple instances of the computer software that share significant portions of the software metadata and code via the multi-instance share-what-is-possible system are described in more detail.

In one implementation explained below, the system and method relate to the software applications implemented in the PHP programming language and are executed by an HTTP server in order to deliver web pages as a part of the web application. The system and method can also be used to apply the techniques and systems described below for other programming languages and other servers.

The PHP language runtime performs file access by means of "streams" API, which act as an intermediary between the language functions and the operating system. The API exposes basic file access function—such as opening file, reading, writing, getting information about file such as its existence, size, etc. The PHP language functions and operators, such as include( ) fopen( ), fread( ), fwrite( ), stat( ), etc. use this API to perform file operations. This API is commonly used to access external resources—such as URLs, ZIP-archived files, etc.—in the same manner as regular files are accessed, and it can also be used to override access to regular files by providing set of procedures to be called when PHP script requires the file to be opened, read, written, etc. to be executed instead of regular operation system file functions.

The system includes the module that uses the API described above to intercept calls for files made by the PHP scripts and reroute calls accessing multiple "virtual copies" of the file to address the single actual file on disk. This way, the single file on the operating system storage can be used to represent an unlimited number of copies of the same file in separate installs of the application, without incurring additional costs in terms both storage space and caching mechanisms' memory and processing.

Since the streams API described above currently does not encompass all file operations, such as changing file access permissions, access times, etc.—the system also overrides PHP functions dealing with such operations in order to direct these operations performed on "virtual copy" of a file to the correct actual file on the operating system storage—either the master copy in the template or the instance copy if one exists.

The system is unique in that it allows the files containing executable code to be modifications to be applied to any part of the application on any of the deployed instances and have these changes be relevant only to that specific copy, and have the copy immediately start using the changed code, while still preserving zero overhead for all parts that are still common. These common parts of the application are further referenced as dynamically generated templates, or DGTs. In addition, no augmentation to Operating System kernel is required with the design described above providing highly portable, scalable, high-efficiency architecture.

Figure 3A:
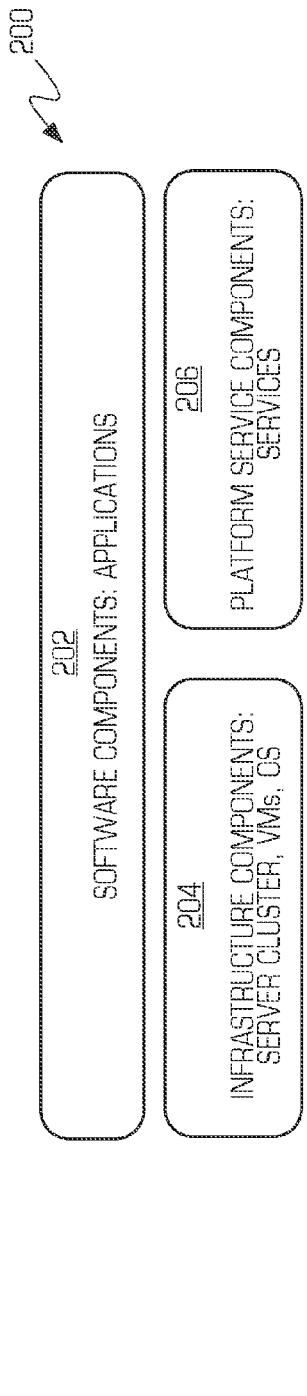
FIGS. 3A and 3B are a logical view and a physical view, respectively, of a typical cloud architecture.
Figure 3B:
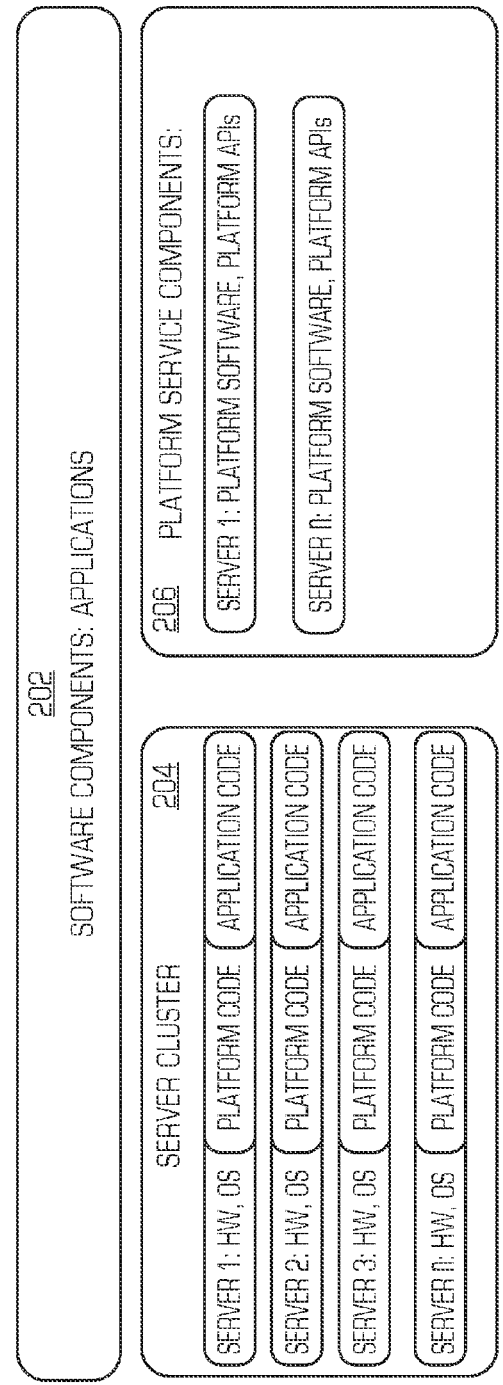

To better understand the system, the architecture of a typical cloud system 200 is briefly described with reference to FIGS. 3A and 3B. As shown in FIG. 3A that is a logical view of the cloud architecture, the cloud architecture 200 has one or more software components 202, such as applications, one or more infrastructure components 204, such as one or more server clusters, one or more virtual machines and one or more operating systems, and one or more platform service components 206, such as a services. As shown in FIG. 3B, the server cluster may include one or more server computers (such as server 1, server 2, server 3, . . . , server n) wherein each server computer has hardware (HW), an operating system (OS), platform code and application code which means that there is a significant amount of duplication of the portions in the typical cloud architecture. Similarly, the platform service components 206 may include platform software and platform APIs for each server computer which means that there is a significant amount of duplication of the service portions in the typical cloud architecture. Now, the system that reduces/eliminates the duplication of the typical cloud architecture is described in more detail.

Figure 4:
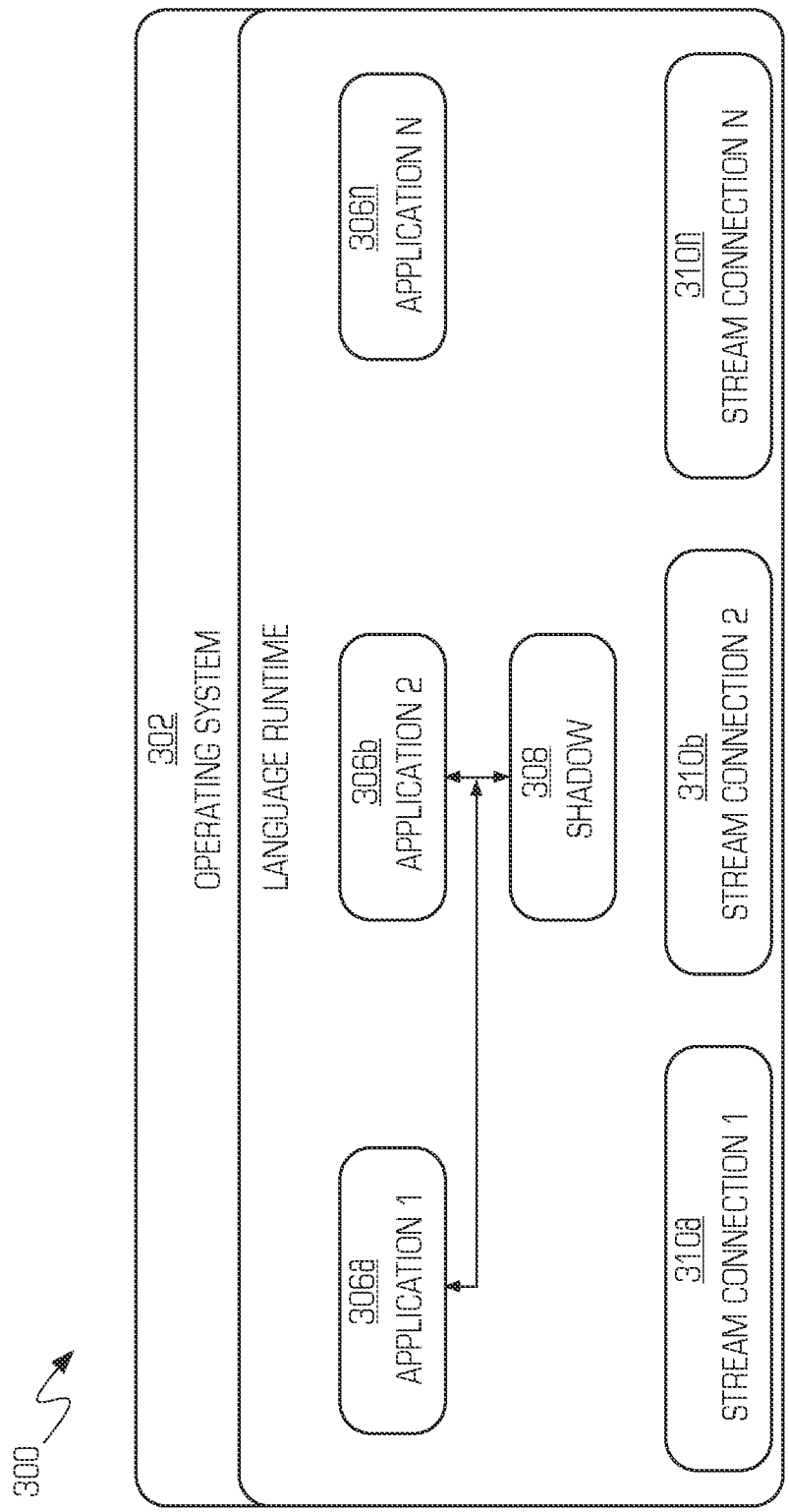
FIG. 4 illustrates an implementation of a shadow stream system.

FIG. 4 illustrates an implementation of a shadow stream system 300 that reduces the duplication of resources of the typical cloud system. The system 300 has an operating system 302 and a language runtime engine 304 that runs on top of the operating system. In one implementation, the language runtime engine 304 may be a plurality of lines of computer code that are executed by one or more processing units on a computer system on which the language runtime engine 304 is instantiated. The language runtime engine 304 may include one or more applications 306 (for example, Application 1 306a, Application 2 306b and Application N 306n as shown in FIG. 4) that are connected to a shadow unit 308. The language runtime 304 may also include one or more stream connections 310 (for example, Stream Connection 1 310a, Stream Connection 2 310b and Stream Connection N 310n as shown in FIG. 4).

In one implementation, the language runtime engine 304 may include an executable module (a loadable module to a language runtime engine 304) that overrides the well known "stream" protocol used to typically handle outside resources. In the example below, the streams handle files on the file system (shown in FIG. 5) are described, but other extensions and streams for other resources can be overridden by the executable module. The system can apply to any interpreted language runtime, such as Java, PHP, Ruby, Python, etc. The example described below assumes the application code is PHP code implemented as a set of PHP source files, as is customary for PHP applications, but the system can be used with other application languages and the like since it is not limited to the PHP example below.

Figure 5:
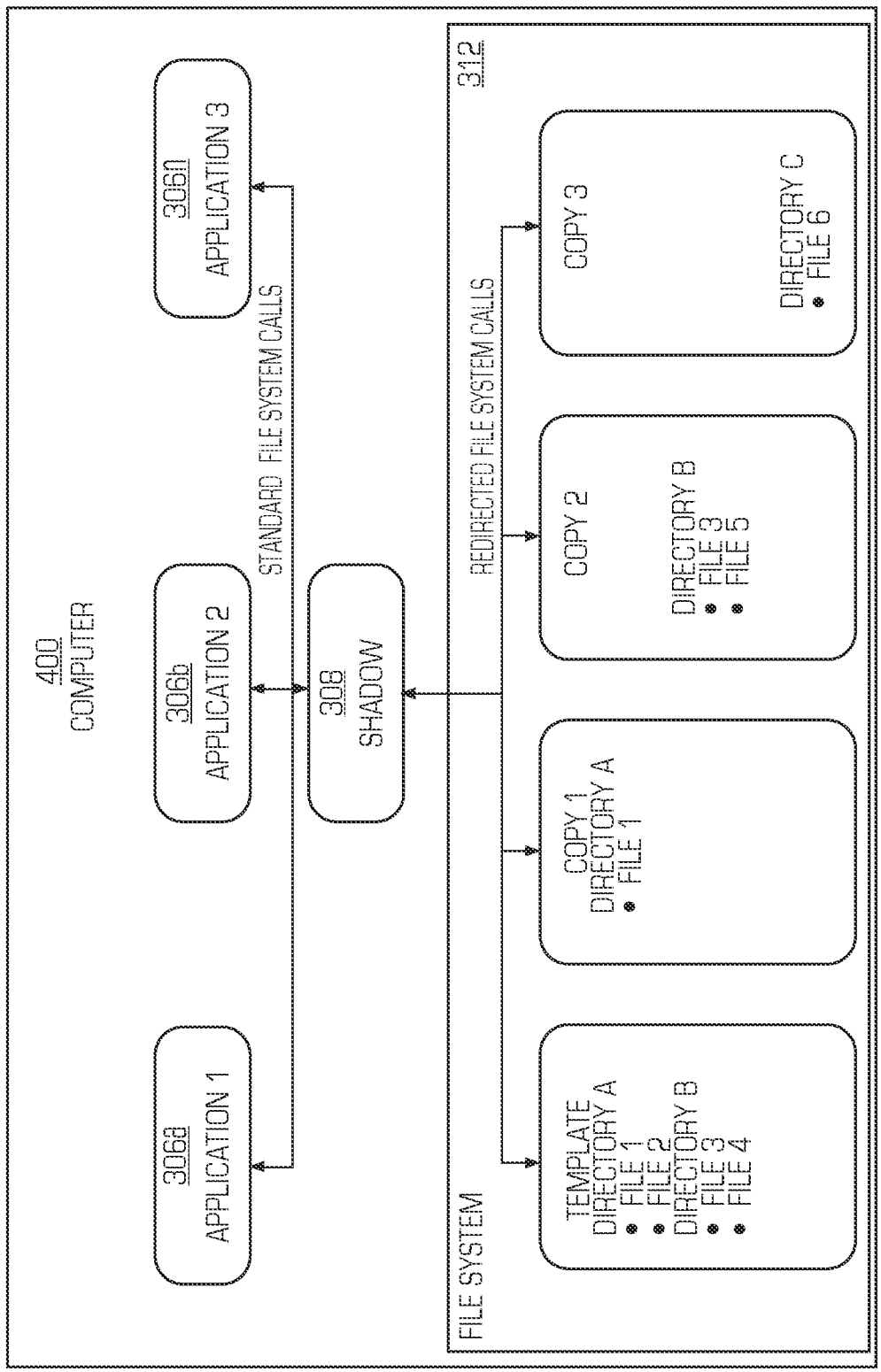
FIG. 5 illustrates an implementation of a directory structure utilizing template architecture that is part of the shadow stream system.

The system designates two sets of application code files—"template" and "instance". The template code (shown in FIG. 5) is the code that is shared between all the copies (i.e. instances) of the application variant and the instance is the code specific to one specific copy of the application with a unique set of functional variation. The code of each application is assumed to reside in a separate directory on the server's file system as shown in FIG. 5, as is customary for most applications.

When an HTTP request for the application is received by the Web Server, it is directed to the template code in the file system 312. The management system described below determines, by examining the contents of the request such as domain name, URL, parameters, etc., which instance this request is directed to and which template corresponds to that instance, and establishes a link between the template and the instance, for the duration of this request by the shadow unit 308.

When the language runtime engine 304 is required to open a source file in order to execute the source code contained in it, the shadow module 308 intercepts this request and first checks if the file to be opened is located inside the current instance and, if not, then checks if the file to be opened is in the template. When the file is being opened only for reading or being accessed in order to check for it's existence or file system metadata (such as size, modification time, etc.), the system will operate against the instance file, if it exists, and then fall back to the template file otherwise. If the file is being opened for creation or update, then the instance file is always chosen.

For example, if there's a file called one.php on the template and no such file on the instance, and the application requests to open file named 'one.php' for reading and then reads it, the instance file is opened and the data contained in it is read. If then the application requests opening the same file for writing, the file named 'one.php' on the instance is created, and when the data is written to it, the file on the instance gets the new data. Then, when the application requests opening the same file again in the same instance, the new instance file will be opened, thus returning the new data that had been written previously. However, if the same application running on another instance would request 'one.php', it would still get the copy of 'one.php' from the template, thus reflecting the fact that one instance was customized and another one was not. The process is completely transparent for the instances, so each instance of the application can be implemented as if it had exclusive own copies of all files, even though in fact only files that are customized on the instance are stored separately.

The name of the file chosen is then passed back to the language runtime engine 304 for creation, reading, or update. If the file is not a part of either template or instance, the file name is passed directly to the language runtime engine 304 without modification. Requests for deleting, renaming and changing a file's permissions are intercepted and modified as well, if necessary.

The process described above leads to creating "shadows" (virtual override copies) of the template files inside the instance, without having to physically copy the files on the file system. This means that neither the file system space nor the memory space (if such file is cached in memory) is used more than once even if multiple "shadows" exist. In this way, if the original file is actually physically updated within the template, this change is instantly picked up by all instances. On the other hand, if the file in changed in the instance, the "shadow" of this file for this instance is thereby overridden, allowing flexible customization of the application.

When the language runtime engine 304 opens a directory in order to enumerate files in it and that directory is inside the template or the instance, the composite list of the files in both the template directory and its corresponding instance directory is prepared and is returned as the result. For example, if a directory called "custom" exists in both the template and the instance, and in the template directory there are files 'one.php' and 'two.php', while in the instance there are files 'two.php' and 'three.php', enumerating the directory on the instance would return the list of three files—'one.php', 'two.php' and 'three.php', and when 'one.php' will be accessed, it will be taken from the template, while 'two.php' and 'three.php' will be taken from the instance.

If in the setup with certain template-instance pairs, certain files are accessed more than once, the resolution for it is stored in memory and on the repeated accesses the file system is not checked but the stored cached result is returned in order to improve the performance.

The system allows for designating some parts of the application—such as parts for caching or storing the configuration—as "instance only", in which case when the file from this part is required, the process above is modified so that the instance file is always used (or created at runtime), as if the template file did not exist.

The Management System Console

A management system (shown in FIG. 6) contains code, such as PHP code in the example being described, that is added to the application (such as a CRM application), which allows for designating explicit relationships between requests (such as domains, URLs, etc.) and instances, so that the instance can be automatically configured on each request.

The system includes database storage (the file system 312 in FIG. 5), which the code of the management system refers to when the request arrives, and if the request matches any of the records in the database, instance information from this record is used to establish template-instance setup.

Figure 6:
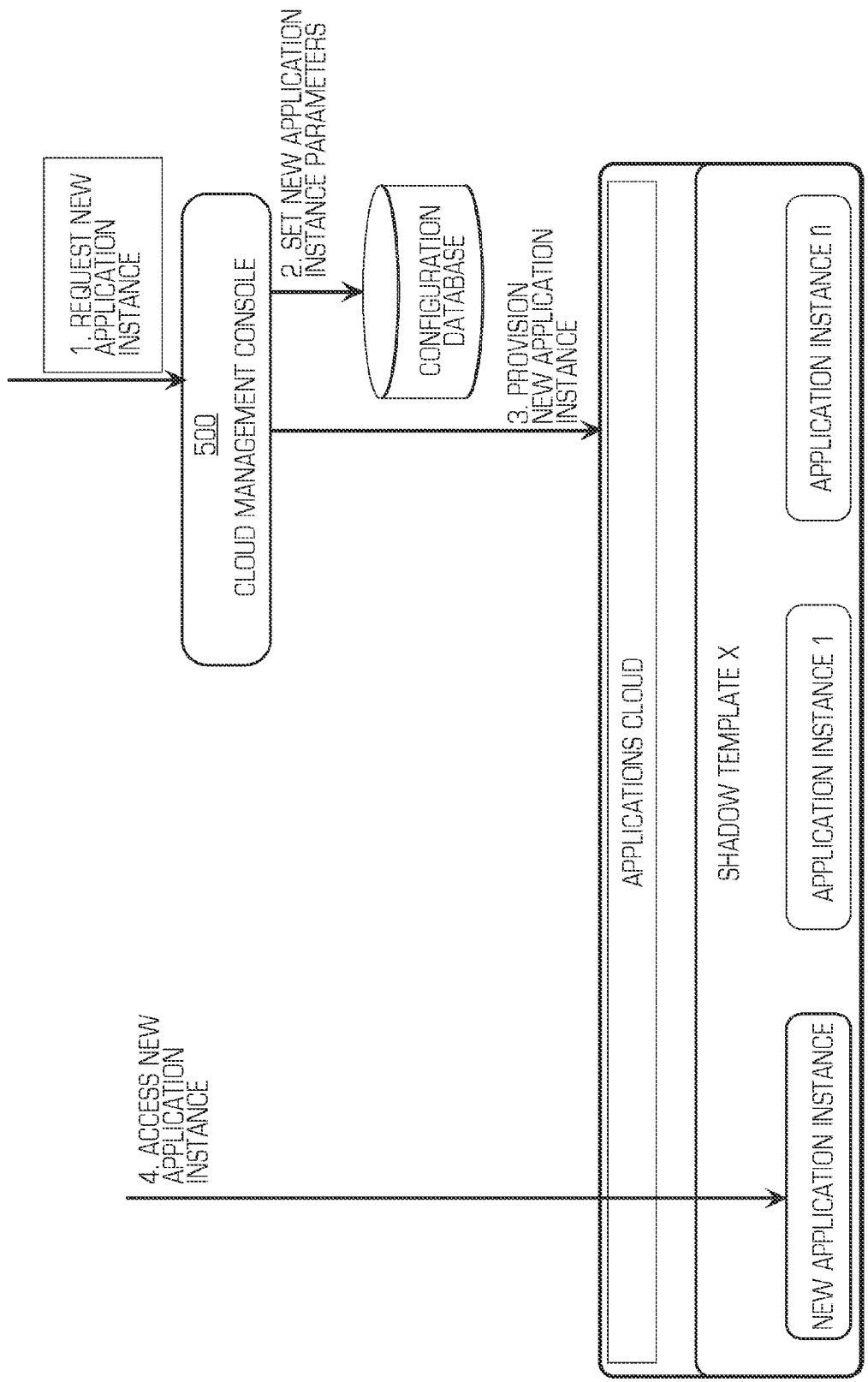
FIG. 6 illustrates a management console of the shadow stream system.

The management system also allows the operator to create new instances (as shown in FIG. 6) by entering new records into the database and creating new instance setups, which initially contain only minimal set of files for maintaining the copy configuration, but can be further customized by the operator on need.

For example, if the operator enters the description of the new site to the database, which will be accessible at the URL http://newclient.mymasshosting.com and the path for the storing the instance is /var/www/newclient.mymasshosting.com/, once the URL is accessed the first time, the system would automatically create the directory named above and copy or create the files specified in the configuration, such as initial database setup files containing the name of the database server and the access details, so that on the first access the copy of the application is automatically installed and ready for work, without need for future operator actions.

After the application is thus prepared, it can be customized by deploying modified copies of the files from the template into the instance, or deploying additional files for the instance only, implementing additional functionality. For example, the SugarCRM application includes metadata files, which describe the representation of the data—such as customer contact data—on the system. If it is necessary to modify this representation on certain instance—e.g. by adding or removing certain fields or rearranging them—new metadata file can be deployed for the instance and will be immediately picked by the system and used instead of the template ones, while all the rest of the files will still be shared with the instance. Note that this is done without making any changes to the application itself—the application implementation is done as if it had exclusive copies of all files.

Alternatively, if all the instances need to be modified—such as upgraded to a newer version or have certain additional functionality deployed by adding code files to the application, and that modification should be available to every instance, the modification can be made to the template files, and will be immediately available to all the instances without having to incur per-instance costs both in storage and upgrade efforts, While the foregoing has been with reference to a particular embodiment of the invention, it will be appreciated by those skilled in the art that changes in this embodiment may be made without departing from the principles and spirit of the disclosure, the scope of which is defined by the appended claims.

The invention claimed is:

1. A generalized multi-instance computer application system comprising:
   a computer system having at least one computer with at least one processor and memory;
   a data store associated with the computer system that stores separate instances of program code of an application and corresponding template code common to all instances of the application wherein the data store also stores a relationship between the corresponding template code and each instance of the application for use by a language runtime engine in determining a relationship between the corresponding template code and the specific one of the instances of the application based on the file access request; and,
   the engine executing in the memory of the computer system, the engine determining, from a file access request to the application, a specific one of the instances of the application for which the file access request is directed and corresponding template code to be linked to the specific one of the instances of the application and linking the specific one of the instances of the application to the corresponding template code for a duration of a session associated with the file access request, so that subsequent file access requests for a same file are processed in the specific one of the instances of the application rather than in the template code common to all instances of the application.

2. The system of claim 1, wherein functions of the corresponding template code are augmented by extending the template code via metadata and source code associated with the corresponding template code.

3. The system of claim 2, wherein the engine redirects a set of file system functions from the corresponding template code to source code for the specific one of the instances of the application.

4. The system of claim 3, wherein the set of file system functions is one of a file creation, a file modification, a file removal, changing metadata of a file, creating a file directory, browsing a file directory and deleting a file directory.

5. The system of claim 1, wherein the engine in response to the file access request determines a file name for a file implicated by the file access request and creates a new copy of the file for the specific one of the instances of the application if a copy of the file does not already exist in the data store.

6. The system of claim 1, wherein a set of files in the data store is designated as belonging only to the instances of the application.

7. The system of claim 1, wherein the application is a customer relationship management application.

8. A multi-instance computer application management method, comprising:
   storing in a data store separate instances of a multi-instance computer application and corresponding template code common to all instance of the application code;
   determining, from a file access request to the application, a specific one of the instances of the application for which the file access request is directed, and corresponding template code to be linked to the specific one of the instances of the application wherein the data store also stores a relationship between the corresponding template code and each instance of the application for use by a language runtime engine in determining a relationship between the corresponding template code and the specific one of the instances of the application based on the file access request; and linking the specific one of the instances of the application to the corresponding template code for a duration of a session associated with processing the file access request so that subsequent file access requests for a same file are processed in the specific one of the instances of the application rather than in the template code common to all instances of the application.

9. The method of claim 8, wherein functions of the corresponding template code are augmented by extending the template code via metadata and source code associated with the corresponding template code.

10. The method of claim 9, wherein language runtime engine redirects a set of file system functions from the corresponding template code to source code for the specific one of the instances of the application.

11. The method in claim 8 further comprising creating a new copy of the file for the specific one of the instances of the application if a copy of the file does not already exist in the data store.

12. The method of claim 8, wherein the application is a customer relationship management application running on the processor of the computer system.

13. A multi-instance computer application management method comprising:

receiving a request to execute program code for a multi-instance computer application;

identifying a specific instance of the multi-instance computer application from data incorporated in the request;

determining whether or not the program code can be found in the specific instance of the multi-instance computer application;

storing a relationship between the corresponding template code and each instance of the application for use by a language runtime engine in determining a relationship between the corresponding template code and the specific one of the instances of the application based on the file access request; and executing the program code in the specific instance of the multi-instance computer application when the program code can be found in the specific instance of the multi-instance computer application, but otherwise locating the program code in a template common to all instances of the multi-instance computer application and executing the located program code.

* * * * *